United States Patent [19]

Lanier

[11] Patent Number: 4,544,321

[45] Date of Patent: Oct. 1, 1985

[54] APPARATUS FOR MOVING A WHEELCHAIR INTO AND OUT OF AN AUTOMOBILE

[76] Inventor: John Lanier, 201 N. Wilmot, Apt. #142, Tucson, Ariz. 85711

[21] Appl. No.: 545,213

[22] Filed: Oct. 26, 1983

[51] Int. Cl.[4] .................................... B60P 1/54

[52] U.S. Cl. .................................... 414/542; 212/269; 414/921

[58] Field of Search .................... 414/462, 541-543, 414/921; 52/121; 212/267, 269

[56] References Cited

U.S. PATENT DOCUMENTS 3,844,418 10/1974 Lamer .................................. 212/267

3,957,164 5/1976 Brown .................................. 414/542

*Primary Examiner*—Robert G. Sheridan

*Attorney, Agent, or Firm*—Quaintance, Murphy & Presta

[57] ABSTRACT

Apparatus for moving a wheelchair into and out of an automobile under the control of a disabled person using the wheelchair. The apparatus comprises a wheelchair supporting assembly secured to the interior roof of the automobile rearwardly of the driver's seat, the wheelchair supporting assembly being movable generally laterally inwardly and outwardly of the automobile when the driver's door is open and having means at its outer end for engaging and lifting the wheelchair. When the disabled person approaches an automobile in the wheelchair, he opens the driver's door, moves the wheelchair close to the automobile and positions himself on the driver's seat in the automobile. Thereafter, he actuates suitable control means on the dashboard to extend the wheelchair supporting assembly laterally outwardly of the automobile. The lifting means at the outer end of the assembly are then connected to the wheelchair and the control means on the dashboard are again actuated to move the lifting means upwardly which folds and lifts the wheelchair, and then to move the support assembly laterally inwardly to move the folded wheelchair into the rear portion of the automobile behind the driver's seat.

5 Claims, 6 Drawing Figures

FIG.1
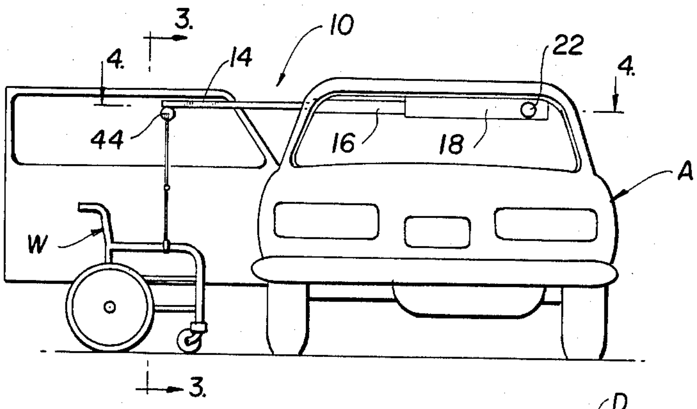
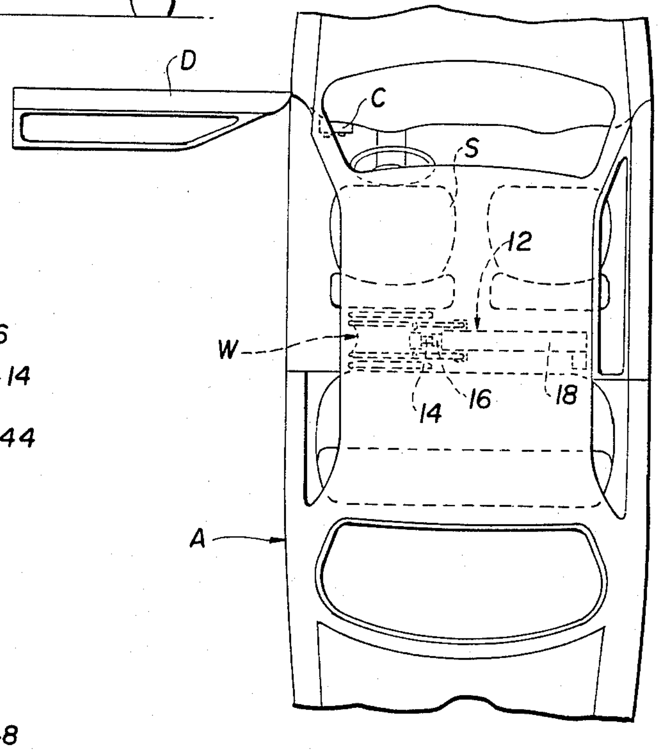
FIG.2
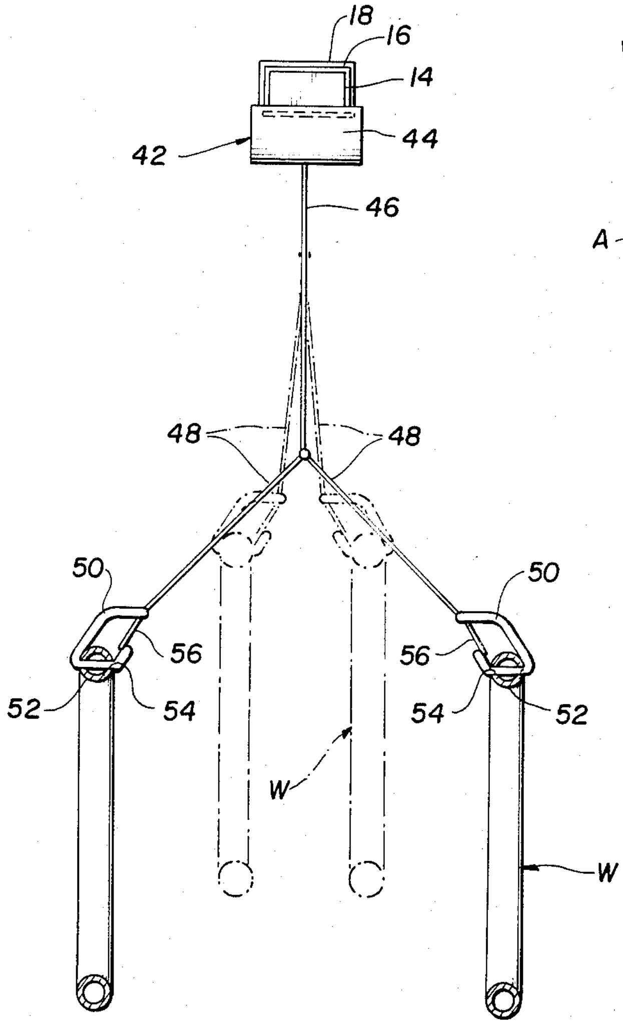
FIG.3

APPARATUS FOR MOVING A WHEELCHAIR INTO AND OUT OF AN AUTOMOBILE

BACKGROUND OF THE INVENTION

The present invention relates to apparatus which can be conveniently controlled by a disabled person, such as a paraplegic, to move a wheelchair into and out of an automobile or the like without requiring the aid of another person.

Heretofore, different types of devices have been utilized for moving a wheelchair into and out of an automobile or the like. Practically all of these devices have been subject to one or more of the following disadvantages:

1. The cost has been excessive;
2. The device has been difficult to install in an automobile and/or has required extensive modification of the automobile;
3. The operation of the device has required a second person to aid the disabled person in the wheelchair;
4. The device has been difficult and burdensome to operate by the disabled person; and/or
5. The device has been unreliable in operation.

Accordingly, a need has arisen for a simple and relatively inexpensive apparatus which can be easily installed in an automobile and conveniently controlled by a disabled person for the purpose of moving his or her wheelchair into and out of the automobile without requiring the help of another person. The apparatus of the present invention meets this need.

SUMMARY OF THE INVENTION

The apparatus of the present invention can be easily installed in an automobile without requiring significant modification of the structure thereof and is particularly adapted for a two-door automobile having a power front seat, a tilt steering wheel and front wheel drive to provide more room behind the driver's seat for the positioning of the lifted and folded wheelchair into and out of the portion of the vehicle behind the driver's seat.

The apparatus of the present invention generally comprises a wheelchair support assembly that is secured to the interior roof of the automobile behind the driver's seat and is movable laterally inwardly and outwardly of the automobile when the driver's door is open. The support assembly preferably is formed of elongated telescoping members which facilitate lateral movement into and out of the rear portion of the automobile. At the outer end of the assembly, lifting means are provided for removably engaging the arms of the wheelchair and for moving it upwardly into a folded position above the floor of the automobile.

When the disabled person approaches the automobile in the wheelchair, he opens the driver's door, moves the wheelchair close to the automobile and positions himself on the driver's seat in the automobile. Thereafter, he acutates suitable control means on the dashboard to extend the wheelchair support assembly laterally outwardly of the automobile. The lifting means at the outer end of the assembly are then connected to the wheelchair and the control means on the dashboard are again actuated to move the lifting means upwardly which folds and lifts the wheelchair, and then to move the support assembly laterally inwardly to move the folded wheelchair into the rear portion of the automobile behind the driver's seat.

The apparatus of the present invention enables a disabled person to conveniently move his or her wheelchair into and out of an automobile with minimal effort through the actuation of simple control means on the dashboard and without requiring the help of another person.

BRIEF DESCRIPTION OF THE DRAWINGS

FIG. 1 is a rear elevational view of an automobile with the apparatus of the present invention installed therein, the apparatus being extended laterally outwardly and connected to the arms of the wheelchair;

FIG. 2 is a plan view of the vehicle and apparatus shown in FIG. 1;

FIG. 3 is an enlarged sectional view taken substantially along line 3—3 in FIG. 1;

DESCRIPTION OF THE PREFERRED EMBODIMENTS

Figure 4:
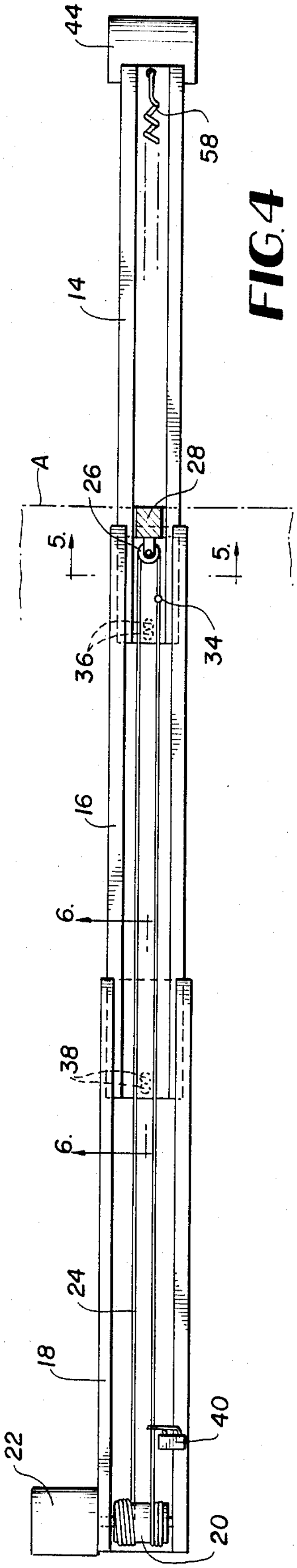
FIG. 4 is an enlarged sectional view taken substantially along line 4—4 in FIG. 1.

As illustrated in FIGS. 1 and 2, the apparatus 10 of the present invention preferably is secured in any suitable manner to the interior roof of an automobile A in the area over the floor behind the front seat S of the automobile and is movable generally laterally outwardly and inwardly of the automobile so that lifting means on the outer end thereof can engage, lift and fold a wheelchair W positioned adjacent the front seat of the automobile to enable it to be moved by the apparatus 10 into and out of the area behind the front seat. The apparatus 10 is connected in any suitable manner to a control means C of any desired type located on the dashboard of the automobile near the driver's seat, as shown in FIG. 2.

The apparatus 10 of the present invention comprises a wheelchair support assembly 12 having a plurality of elongated, telescoping members 14, 16 and 18. The innermost and largest telescoping member 18 is secured in any suitable manner to the interior roof of the automobile A in the area behind the front seats thereof, the intermediate telescoping member 16 is slidably mounted within the inner member 18, and the outermost telescoping member 14 is slidably mounted within the intermediate member 16. The telescoping members 14 and 16 are movable between the extended or outer positions shown in FIG. 1 and the retracted or inner positions shown in FIG. 2 for a purpose to be more fully described hereinafter.

Figure 5:
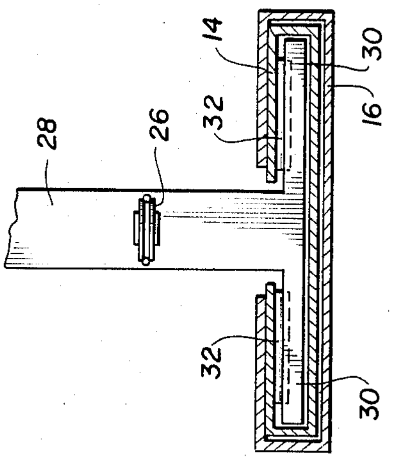
FIG. 5 is a sectional view taken substantially along line 5—5 in FIG. 4.

Referring to FIGS. 1 and 4, the innermost telescoping member 18 is positioned over the floor area behind the front seats of the vehicle. A roller or drum 20 is rotatably mounted on the telescoping member 18 near the inner end thereof and is rotatably driven by a motor 22 of any suitable type, such as a 12 volt D.C. reversible motor that is compatible with the electrical system of a typical automobile. A flexible cable 24 of any suitable type is secured at its ends to opposite sides of the drum 20 and extends longitudinally along the inner telescoping member 18 and the intermediate telescoping member 16, and is looped around a pulley 26 rotatably mounted on a support post 28 secured to the roof of the vehicle near the outer portion thereof behind the driver's seat. As illustrated in FIG. 5, the support post 28 has laterally outwardly extending support arms 30 at its lower end which are provided with suitable bearing means, such as roller bearings 32, on their upper surfaces for movably supporting the outer telescoping member 14 thereon.

As shown in FIG. 4, the cable 24 is secured at 34 by any suitable means to the inner end of the outer telescoping member 14. In this manner, the telescoping member 14 is moved inwardly or outwardly depending on the direction of movement of the cable 24 in response to rotation of the drum 20 by the motor 22. Accordingly, when it is desired to move the telescoping members 14 and 16 to the outer positions shown in FIG. 1, the motor 22 and drum 20 are rotated in a direction to move the lower portion of the cable 24 to the right as seen in FIG. 4.

Figure 6:
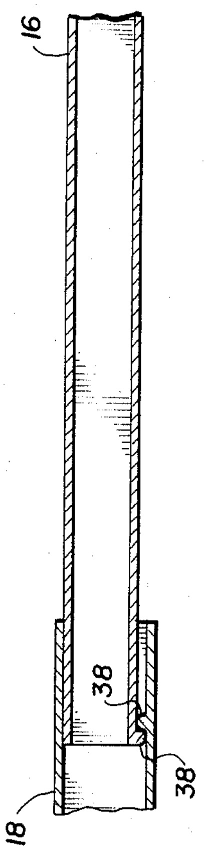
FIG. 6 is a sectional view taken substantially along line 6—6 in FIG. 4.

Stop means of any suitable type are provided on the telescoping members 14, 16 and 18 so that outward and inward movement of the telescoping members 14 and 16 in response to movement of the cable 24 are limited. For example, outward movement of the outer telescoping member 14 is limited by engagement of cooperating stop means 36 on the inner end of the telescoping member 14 and the outer end of the telescoping member 16. Continued movement of the cable 24 in the same direction after engagement of the stop means 356 causes the intermediate telescoping member 16 to be moved outwardly relative to the inner telescoping member 18 until the cooperating stop members 38 on the telescoping members 16 and 18 are brought into engagement with each other as shown in FIG. 6. The stop means 36 and 38 may be of any suitable structure, such as raised portions on the telescoping members of the type shown in FIG. 6.

When it is desired to move the telescoping members 14 and 16 to the inner positions shown in FIG. 2, the cable 24 is moved in the opposite direction (the lower portion of the cable 24 moves to the left in FIG. 4) by reversing the rotation of the drum 20 by the motor 22. The outer telescoping member 14 is then moved into the intermediate telescoping member 16 until suitable stop means (not shown) on these members come into engagement. Thereafter, continued movement of the cable 24 in the same direction causes the intermediate member 16 to be moved within the inner telescoping member 18 until it engages a limit switch 40 of any suitable type that is operatively connected to the motor 22 for stopping its rotation.

Referring to FIGS. 3 and 4, a wheelchair lifting device 42 is secured to the outer end of the outer telescoping member 14 and comprises a reversible motor and drum combination 44 like the drum 20 and motor 22 having a flexible cable 46 secured thereto. The cable 46 is provided with a pair of downwardly extending sections 48 having generally U-shaped support members 50 on the lower ends thereof that are adapted to extend through holes 52 in the arms 54 of the wheelchair W, as specifically illustrated in FIG. 3. The support members 50 are provided with releasable locking means 56 of any suitable construction for the purpose of releasably retaining them within the holes through the wheelchair arms 54.

The motors 22 and 44 are connected in any suitable manner to a suitable power means such as the automobile battery (not shown) and are also connected to the control means C on the automobile dashboard so that these motors can be actuated at the dashboard by the occupant of the driver's seat.

Although the telescoping members 14, 16 and 18 are illustrated in the drawings as being elongated channel members with a substantially rectangular cross section, it is noted that the telescoping members may have any suitable shape or construction in accordance with the principles of the present invention.

In the operation of the apparatus 10 of the present invention, a disabled person in the wheelchair W opens the front door D of the automobile A, positions the wheelchair W adjacent the front seat S of the automobile and moves himself into the driver's seat. Thereafter, he actuates the control means C on the dashboard to activate the motor 22 and drum 20 and move the telescoping members 14 and 16 to the outer positions shown in FIG. 1. He then actuates the control means C for a second time to activate the motor assembly 44 and move the support cable 46 to the lower position shown in FIG. 3 wherein the support members 50 can be positioned in the holes 52 of the arms 54 of the wheelchair W.

The disabled person then actuates the control means C to rotate the motor assembly 44 in the opposite direction to move the cable 46 upwardly which causes the wheelchair W to be lifted and folded to the broken line position shown in FIG. 3. The folded wheelchair W is lifted to a position above the outer edge of the automobile floor so that it can be moved into the automobile.

By another actuation of the control means C on the dashboard, the motor 22 and drum 20 are rotated in the opposite direction to move the telescoping members 14 and 16 to the inner or retracted positions shown in FIG. 2 wherein the folded and lifted wheelchair W is moved within the automobile in a position above the floor of the automobile behind the front seat thereof. Thereafter, the disabled person again actuates the control means C to rotate the motor assembly 44 so that the cable 46 moves downwardly to position the wheelchair W on the rear floor area of the vehicle.

When the disabled person has completed his use of the automobile A and desires to again occupy the wheelchair W, the procedure hereinbefore described is reversed to remove the wheelchair W from the automobile and lower it onto the ground adjacent the front seat S of the vehicle. All of this can be conveniently accomplished by the disabled person alone from his position in the driver's seat of the automobile.

What I claim is:

1. Apparatus for moving a wheelchair into and out of the space behind the seat of an automobile, comprising:

a wheelchair support assembly mounted on the roof of the automobile behind the front seat thereof, said support assembly being movable between an outer position wherein it extends substantially laterally outwardly of the automobile and an inner position wherein it is disposed within the automobile behind the driver's seat thereof, said support assembly comprising a plurality of elongated telescoping members, said telescoping members comprising an inner member mounted on the roof of the automobile, an intermediate member slidably mounted within said inner member, and an outer member slidably mounted within said intermediate member;

lifting means movably mounted on the outer end of said support assembly for engaging and lifting a wheelchair positioned adjacent the automobile near the driver's seat thereof when said support assembly is in said outer position;

actuating means connected to said support assembly and said lifting means for selectively moving said support assembly and said lifting means, said actuating means comprising a first reversible motor and a first rotatable drum operatively connected to said first motor, said first motor and said first drum being mounted on said inner member, and a first flexible cable connected to said first drum and to said outer member so that rotation of said first drum in one direction by said motor moves said outer member inwardly and rotation of said first drum in the opposite direction moves said outer member outwardly;

a support post mounted on the automobile roof near the outer portion thereof behind the driver's seat, said support post having a pulley rotatably mounted thereon, said first cable extending around said pulley and having its ends secured to said first drum, and said outer member being slidably supported on said support post; and control means connected to said actuating means and being mounted on the automobile near the driver's seat thereof.

2. The apparatus of claim 1 wherein said support post has laterally outwardly extending support arms at its lower end, bearing means are mounted on the upper surfaces of said support arms, and said outer member is slidably mounted on said support arms in engagement with said bearing means.

3. The apparatus of claim 1 wherein stop means are provided on said inner, said intermediate and said outer members to limit the inner and outer movement thereof.

4. The apparatus of claim 1 wherein said lifting means comprises a second flexible cable having a pair of downwardly extending sections with support members on the lower ends thereof for releasable engagement with the arms of the wheelchair.

5. The apparatus of claim 4 wherein said actuating means comprise a second reversible motor and a second rotatable drum operatively connected to said second motor, said second motor and said second drum being mounted on the outer end of said outer member, and said second cable being secured at its upper end to said second drum.

* * * * *